United States Patent [19]

Lederman

[11] Patent Number: 5,588,210
[45] Date of Patent: Dec. 31, 1996

[54] METHOD OF MANUFACTURING A UNITIZED SEAL

[75] Inventor: Frederick E. Lederman, Sandusky, Ohio

[73] Assignee: General Motors Corporation, Detroit, Mich.

[21] Appl. No.: 286,362

[22] Filed: Aug. 5, 1994

[51] Int. Cl.⁶ .................................................. B29C 45/08
[52] U.S. Cl. ................................ 29/898; 29/413; 29/432; 264/163
[58] Field of Search .................................. 264/138, 238, 264/163; 29/898, 888.3, 413, 432

[56] References Cited

U.S. PATENT DOCUMENTS

| | | | |
|---|---|---|---|
| 3,101,954 | 8/1963 | Huddle | 277/39 |
| 4,822,183 | 4/1989 | Lederman | 384/607 |
| 5,046,229 | 9/1991 | Lederman | 29/418 |
| 5,046,248 | 9/1991 | Lederman | 29/898.041 |
| 5,201,533 | 4/1993 | Lederman | 277/152 |
| 5,326,523 | 7/1994 | Güstävel et al. | 264/163 |
| 5,346,662 | 9/1994 | Black et al. | 264/138 |
| 5,472,334 | 12/1995 | Takahashi | 264/163 |
| 5,502,547 | 3/1996 | Shirai | 355/215 |

FOREIGN PATENT DOCUMENTS 1070221  4/1986  Japan ..................... 264/163

OTHER PUBLICATIONS

Document Number 08/245126 Name Lederman Filing Date 17–May–1994.

Document Number 08/247202 Name Lederman Filing Date 20–May–1994.

Document Number 08/250,878 Name Lederman Filing Date 31–May–1994.

Primary Examiner—Irene Cuda
Assistant Examiner—Marc W. Butler
Attorney, Agent, or Firm—Patrick M. Griffin

[57] ABSTRACT

A simplified method of manufacturing and assembling a unitized seal uses only three basic components, and no steps involving direct molding of elastomer to casings, or gluing or otherwise securing elastomer to the casings. Two simple, inner and outer casings have axially opposed, radially overlapping annular webs, and radially opposed, oppositely axially extending seal walls. An integral seal unit has coplanar, inner and outer disks joined at a frangible central seam. Each disk has a pair of converging seal lips disposed symmetrically to either sid of a respective seal wall. When the unit is squeezed axially between the casings during assembly, the seal walls enter between the seal lips, bottom out on the disks, break the seam, and embed the disks automatically into the casings, with no other assembly steps needed.

2 Claims, 4 Drawing Sheets

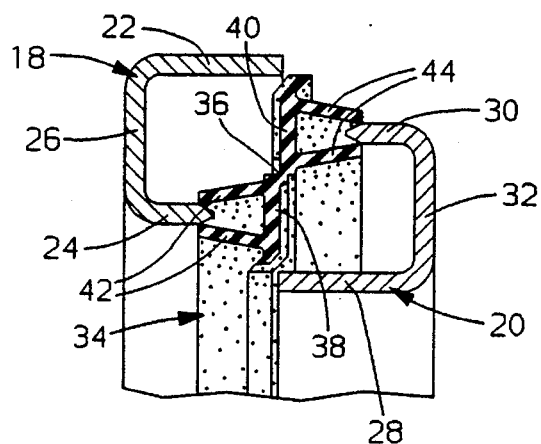
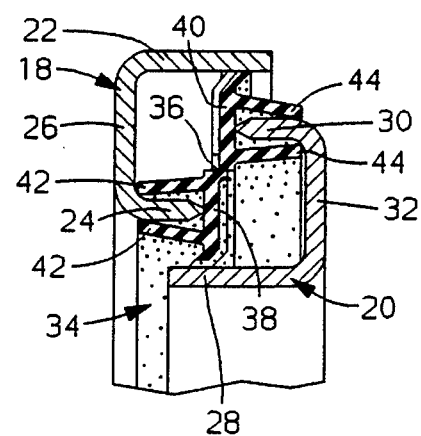
FIG. 7       FIG. 8
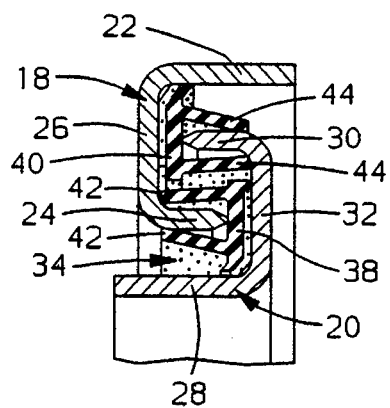
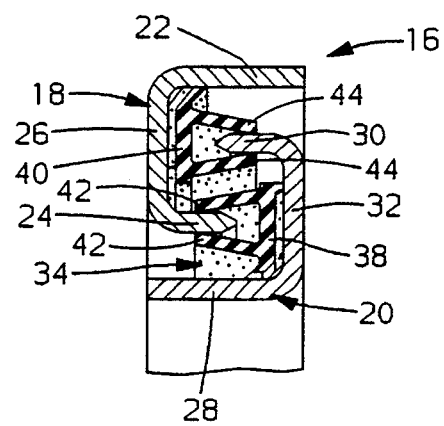
FIG. 9       FIG. 10
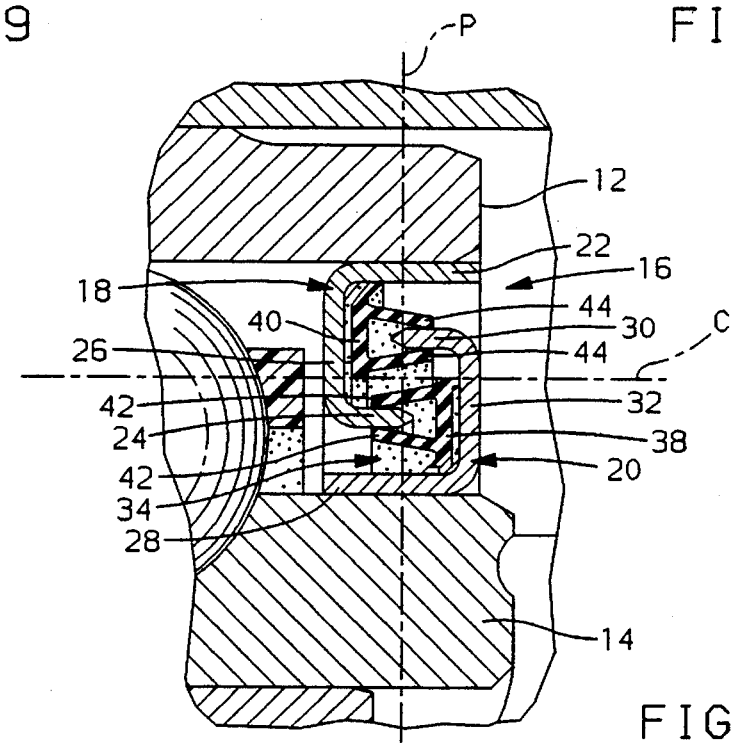
FIG. 11

METHOD OF MANUFACTURING A UNITIZED SEAL

This invention relates to unitized seals in general, and specifically to a simplified method for making such a seal that provides multiple levels of sealing contact.

BACKGROUND OF THE INVENTION

So called unitized seals are so named because they can be installed as a unit in the annular space between a pair of relatively rotatable members, such as bearing races. Each of a pair of nested, coaxial metal casings is press fit to one bearing race, while enclosed internal rubbing seals provide sealing contact. Most older designs mold the seals directly to the stamped casings. This requires holding the casings in a mold while the elastomer seal lips are injection molded to and around some part or edge of the casing. This molding step is somewhat difficult to control, since the stamped metal casings do not always perfectly match the shape of the mold cavities in which they are held.

A newer type of unitized seal avoids the seal molding step by using sealing disks precut from flat sheets of polytetrafluoroethylene (PTFE) material, which are separately glued or otherwise bonded to the casings. Potentially lower seal torque or friction is possible with PTFE disks, because of the slippery nature of the material.

A problem faced by both types of seals, integrally molded and PTFE disk type, is the running eccentricity that bearing races are subject to, which continually widens and narrows the annular space between the seal casings mounted to them. Running eccentricity continually compresses and relaxes the seal lips. This exacerbates the stress in a seal, especially when the edge of the lip is bent back sharply at the line of sealing contact.

A seal design of the PTFE disk type is shown in co-assigned U.S. Pat. No. 5,201,533. There, two oppositely facing disks of seal material make four separate areas of continual sealing contact, which alternate in orientation. Therefore, despite any running eccentricity, two of the four alternating areas of sealing contact are always increasing their pressure when the other two are decreasing. The seal is manufactured by cutting the two disks, gluing or otherwise securing them to the casings in a radially overlapping fashion, pushing the casings axially together, beyond their ultimate, installation position spacing, and then pulling them back.

There may be circumstances where an elastomer type seal that had the same level of sealing integrity would be useful, provided a method for its manufacture could be devised that still avoided the step of direct molding to the casing. Ideally, such a method would be no more, and preferably less, complicated than the method disclosed in U.S. Pat. No. 5,201,533.

SUMMARY OF THE INVENTION

The invention provides a method for manufacturing an elastomer type unitized seal that has four alternating areas of sealing contact, as does the design discussed above, but in which the elastomer seal lips are all molded separately as part of an integral unit, not molded directly to the two casings. Furthermore, the assembly method is simpler, in that no assembly steps beyond just pushing the casings together is needed.

In the embodiment disclosed, outer and inner channel shaped stamped casings have axially spaced annular webs and radially spaced, equal length cylindrical seal walls. The terminal circular edges of each seal wall faces the center of the opposed web. Therefore, if pushed axially together, the terminal edge of each will bottom out simultaneously on the web of the opposite casing. The radial thickness of the sealing walls of the casings is a known, uniform quantity.

In its pre-installation, free molded state, the molded seal unit has two pairs of frustoconical, converging seal lips, extending in opposite directions from inner and outer disks and located so as to symmetrically overlap a respective cylindrical seal wall. The converging lips do not touch, but are open to a degree just less than the radial thickness of the casing sealing walls. The inner edges of the disks are initially molded together, in a plane, at a thin, circular seam.

To assemble, the casings are aligned concentrically, with the molded seal unit axially between, and then pushed axially together. The elastomer portion of the seal assembly essentially self installs as this is done. The opposed sealing walls insert themselves between the two pairs of sealing lips, then bottom out on the disks, shearing the seam. Ultimately, the parted halves of the seal unit are pushed tightly into the opposed casings, abutted with the casing webs, and then the casings are withdrawn back to their installation spacing. The inner and outer sides of the sealing walls are then each continually engaged with a seal lip.

DESCRIPTION OF THE PREFERRED EMBODIMENT

These and other objects and features of the invention will appear from the following written description, and from the drawings, in which:

FIG. 4 shows the molds opened with the modular molded seal unit between;

FIG. 5 shows the casings concentrically aligned, with the seal unit between;

FIG. 7 shows the casings being initially pushed together;

FIG. 8 shows the casings pushed farther together;

FIG. 9 shows the casings pushed completely together, with the modular unit sheared in half and the two halves fully embedded into the casings; disks in a slightly deformed condition;

FIG. 10 shows the casings being pulled back to their installation position;

FIG. 11 shows the seal installed between the bearing races.

Figure 1:
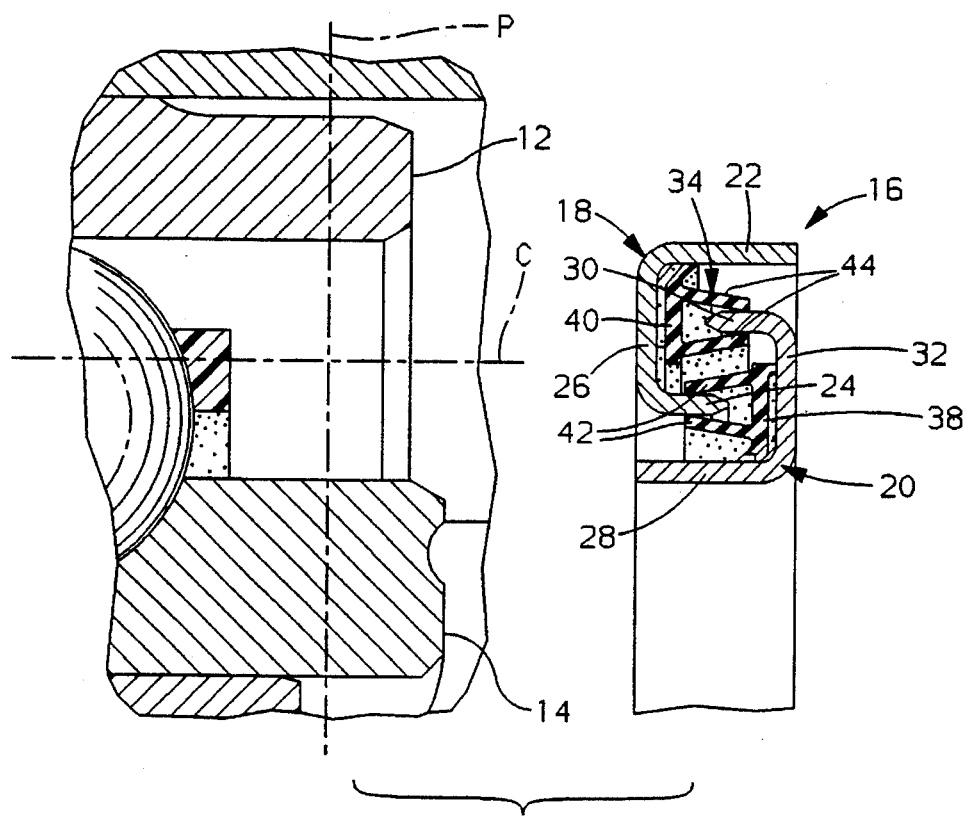
FIG. 1 is a cross section through a vehicle wheel bearing incorporating the seal of the invention, with the seal beside, prior to installation.
Figure 2A:
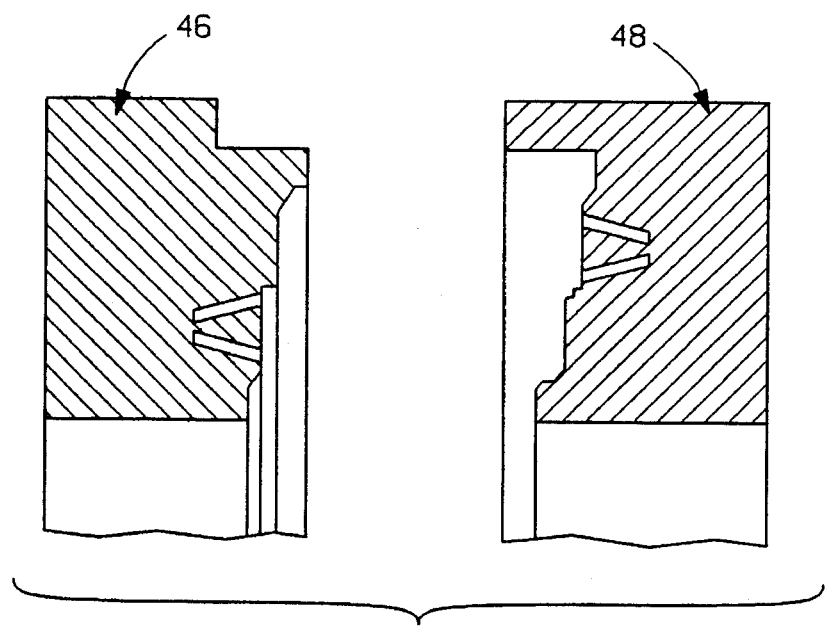
FIG. 2A is a cross section through a pair of molds.
Figure 2B:
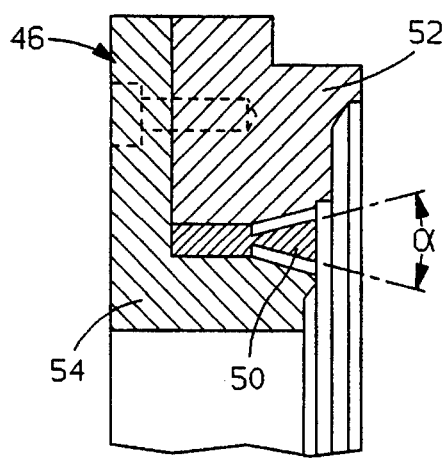
FIG. 2B is a detail of one mold.

Referring first to FIGS. 1 and 11, a vehicle wheel bearing includes two relatively rotatable members, an outer race 12, which surrounds a coaxial inner race 14 to form an annular space therebetween. To create a convenient reference frame, the annular space is bisected both by an imaginary cylinder indicated at the dotted line C, and a plane perpendicular thereto, labeled P. A unitized seal made according to the invention, indicated generally at 16, is installed between the races 12 and 14. In fact, two would be installed, one on each side, but only one need be described. Seal 16 blocks an exterior area from an interior area, and is intended to keep the two separate, although some exchange in either direction is inevitable, and can only be minimized.

Figure 5:
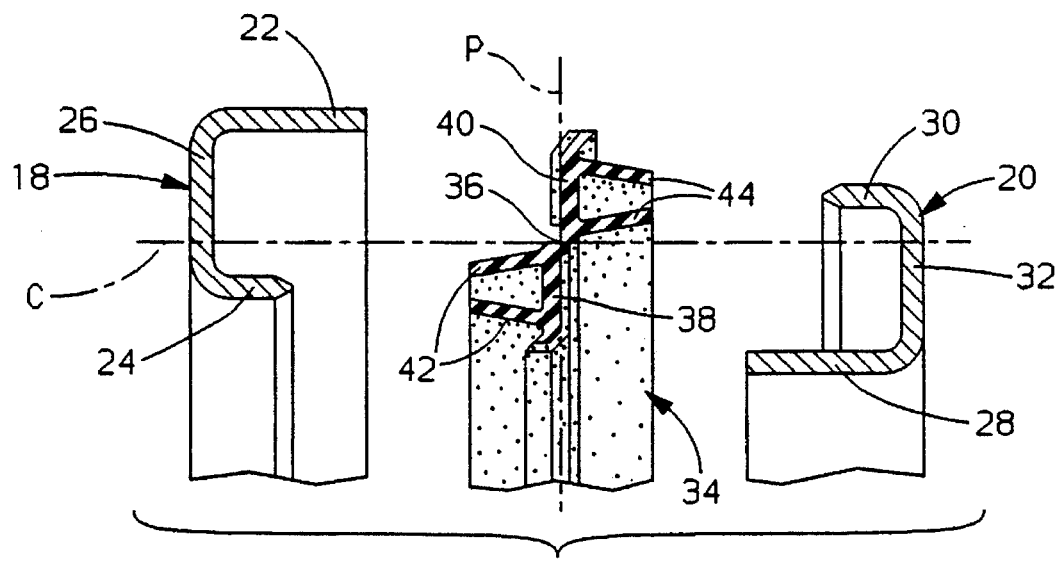
Figure 6:
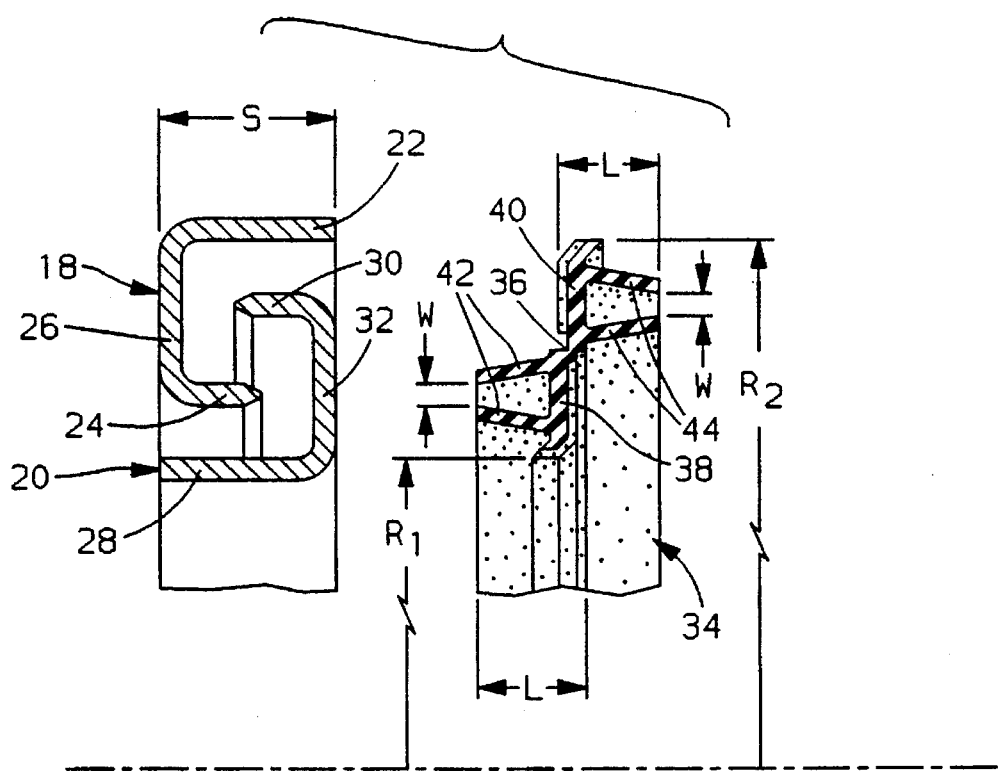
FIG. 6 shows the casings in their installation position, with the seal unit to the side.

Referring next to FIGS. 5 and 6, two of the three basic components of seal 16 are described in detail. Two casings, an outer casing indicated generally at 18 and an inner casing indicated generally at 20, are each channel shaped, or C shaped, in cross section. Each is stamped from steel or other thin metal stock, with a uniform thickness. Outer casing 18 includes a longer cylindrical installation wall 22, a shorter, radially spaced cylindrical seal wall 24, which faces axially outwardly, and an annular web 26 that interconnects them. Inner casing 20 is the mirror image of 18 about C and P, with an equal length cylindrical installation wall 28 and equally shorter seal wall 30 that faces axially inwardly, and an interconnecting annular web 32. The casings 18 and 20 are shown in their ultimate installation position, concentrically aligned, and with a total, web to web axial spacing S. The elastomer part of the seal, a modular unit 34, is shown to the side for size comparison. In the installation position, the oppositely extending seal walls 24 and 30 lie on opposite sides of C, and their terminal edges face the radial centers of, but do not touch, the opposed webs 32 and 26 respectively. Those edges can be sharpened slightly, if desired, but would not be given a knife edge.

Still referring to FIGS. 5 and 6, the only other basic component of seal 16 is the seal unit 34, which is integrally molded in a manner more fully described below. It's dimensions and shape in the free molded, pre installation state shown can best be described in terms of the same reference frame as the casings 18 and 20, as well as by reference to the casings 18 and 20 themselves. Unit 34, in general, consists of two oppositely facing, open annular troughs joined at a frangible, central circular seam 36. More specifically, radially inner and outer disks 38 and 40 lie on the central plane P, and to either radial side of the central cylinder C. Inner disk 38 has an inner radius $R_1$ slightly smaller than the interior surface of inner casing installation wall 28, while outer disk 40 has an outer radius $R_2$ slightly larger than the interior surface of outer casing installation wall 22. Therefore, inner disk 38 is the right size and shape to abut the radially inner portion of inner casing web 32, while outer disk 40 is abuttable with the radially outer portion of outer casing web 26. A pair of converging, frustoconical lips 42 extend axially inwardly from inner disk 38, subtending a shallow angle of approximately thirty degrees. The inner seal lips 42 are best defined in relation to the outer casing seal wall 24. Specifically, they are symmetrically disposed to either side of seal wall 24, with an effective axial length L that is longer than wall 24, but still shorter than the casing installation spacing S. The seal lips 42 do not touch, but instead present a narrow annular opening with a radial width W just less than the thickness of seal wall 24. Likewise, a similar pair of converging, frustoconical lips 44 extend axially outwardly from outer disk 40, defined in the same fashion relative to the inner casing seal wall 30. Therefore, the two pairs of seal lips 42 and 44 are identical but for the radii at which they lie. These dimensional relationships of the various parts of the seal unit 34 and the casings 18 and 20 cooperate in the assembly method for seal 16 described below.

The initial steps in the manufacture of seal 16, obviously, would be the manufacture of the three basic components, the casings 18 and 20, and the seal unit 34. The casings 18 and 20 are simple stampings, like those is standard unitized seals. Therefore, their manufacture need not be detailed, since it would follow standard stamping technique. However, since the assembly process involves no direct molding of any elastomer to the casings 18 and 20, nor gluing or other separate securement of a seal member, this does allow the casings 18 and 20 to have the simplest cross sectional shape possible. The cross section comprises two cylinders and one annular web only, with no inherent radial overlap of any of its outer surfaces, and with no holes or out turned edges needed for molding or gluing purposes. Therefore, the casings 18 and 20 are also amenable to being molded of hard nylon or other suitable material by a simple, axial draw technique, if so desired.

Figure 3:
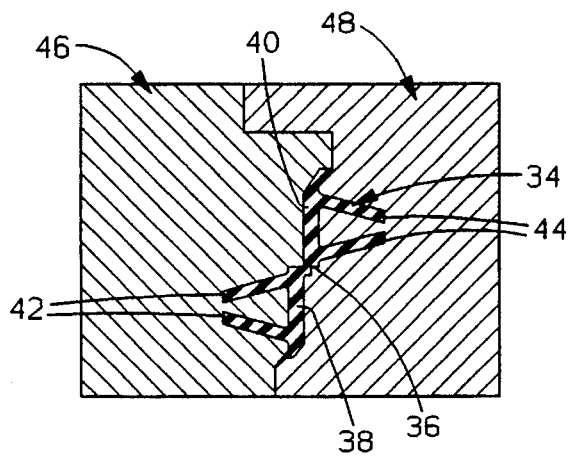
FIG. 3 shows the molds closed.
Figure 4:
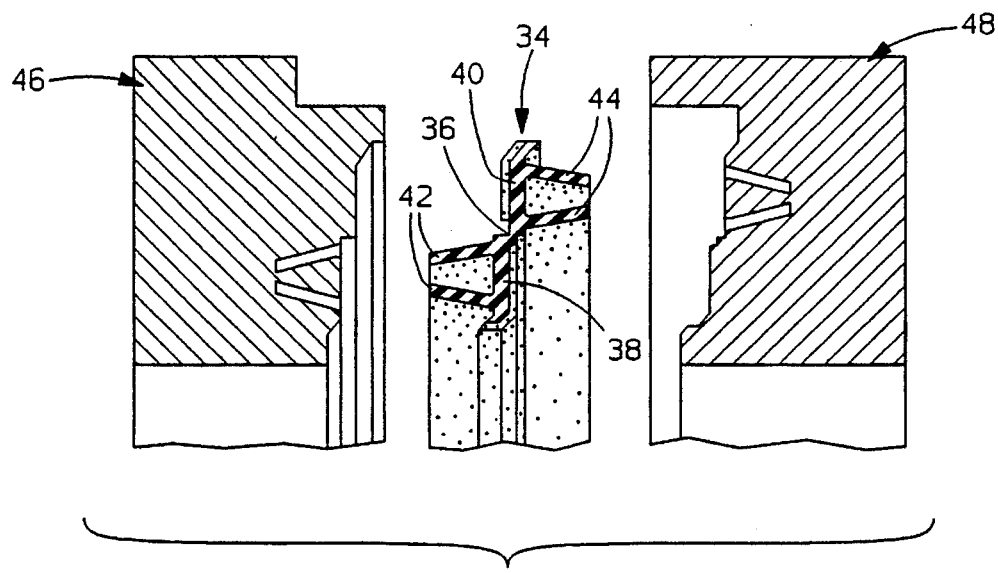

Referring next to FIGS. 2A through 4, the manufacture of the third basic component, seal unit 34, is described. Seal unit 34 is not as simple a part as the casings 18 and 20, since it does have radial overlap of the seal lips 42 and 44 with the disks 38 and 40. Therefore, more detail of its manufacture is illustrated. Unit 34 is formed between a pair of molds, indicated generally at 46 and 48. Each is machined with a cavity that matches the outer surface of the left and right outer surfaces respectively of the unit 34. The cavities would be difficult to machine integrally into a solid mold, especially that part of the cavity that corresponds to the seal lips 42 or 44. Therefore, it would be more practical to build up a compound mold out of separately machined sections that were later bolted together. As seen in FIG. 2B, one solution would be to machine a separate insert with a rim 50 having a dove tail shaped cross section, with a shallow angle alpha that corresponds to the angle subtended between the seal lips 42. The rim 50 and separate sections 52 and 54 are simple to machine separately, with no thin concavities or complex surfaces. Rim 50 is then bolted between two main mold sections 52 and 54 to produce the mold 46. Mold 48 would be built up in similar fashion. Unit 34 is then injection molded between the closed molds 46 and 48 in conventional fashion, as shown in FIG. 3, of a suitable commercially available seal elastomer. Finally, the molds 46 and 48 are parted, and unit 34 ejected, as shown in FIG. 4. Conventional ejector pins, not illustrated, would push the outer surfaces of the disks 38 and 40 away from the molds 46 and 48, thereby isolating the central seam 36 from stress. The lips 42 and 44 themselves would be flexible enough to be withdrawn without damage as the ejector pins pushed the disks 38 and 40 out and away from the molds 46 and 48.

Referring next to FIGS. 7 through 10, the actual assembly of seal 16 is illustrated. The casings 18 and 20 are first aligned concentrically with each other, with the seal unit 34 between, and with the edges of the seal walls 24 and 30 at or just between the openings between the pairs of lips 42 and 44 as shown in FIG. 7. This alignment could be done in a fixture or jig, or could be done by a manual operator who simply inserts the edges of the seal walls 24 and 30 simultaneously between the seal lips 42 and 44. Doing that alone will sufficiently align the casings 18 and 20 with the unit 34. Then, as shown in FIG. 8, the casings 18 and 20 are pushed axially together, which will bring the edges of the seal walls 24 and 30 against the disks 38 and 40 respectively. Next, the casings 18 and 20 are pushed axially together as far as possible, which pushes the terminal edges of the seal walls 24 and 30 through the plane P and axially past one another. This shearing action tears the seam 36, dividing unit 34 in two. Simultaneously, the outer edges of the disks 38 and 48 are dragged inwardly along the inner surfaces of the casing installation walls 28 and 22 respectively. Ultimately, as seen in FIG. 9, the disks 38 and 40 abut the inner surfaces of the webs 32 and 26 respectively, where they are maintained in place by the frictional interference of the outer edges of the disks 38 and 40 with the inner surfaces of the installation walls 28 and 22. The pairs of seal lips 42 and 44 are deformed slightly from their symmetrical position. Finally, as shown in FIG. 10 the casings can be parted, to the FIG. 10 position, or at least far enough to pull the edges of the seal walls 24 and 30 away from the disks 38 and 40. Reparting the casings 18 and 20 is not as critical an assembly state, since installing the seal 16 will accomplish the same effect, but it does take some stress off of the seal lip pairs 42 and 44 before installation, allowing them to flex back almost to their free state position.

Referring next to FIG. 11, the installed position of seal 16 is illustrated. The actual installation would be conventional, and is not shown. A suitable tool would push axially inwardly on both the edge of outer installation wall 22 and the inner casing web 32 until they were flush with the outer faces of the races 12 and 14. In the installed position, there is insignificant axial overlap between the two seal walls 24 and 30. However, the effective length L of the two pairs of seal lips 42 and 44, being intermediate the length of the walls 24 and 30, but less than S, is sufficient to assure that they axially overlap the seal walls 24 and 30 without rubbing on the webs 26 and 32. In addition, the free state width W described above assures that there are four lines of sealing contact maintained between the two pairs of seal lips 42, 44 and the respective seal walls 24 and 30 that they axially overlap. The shallow angle of the seal walls 24 and 30 relative to the seal lips 42, 44, creates less stress at the points (or lines) of contact than is the case with a disk shaped seal. (A seal disk is basically perpendicular to the cylindrical member that it contacts, and so has its edge bent back sharply, nearly 90 degrees, from the plane of the disk.) That same spatial relation makes for less stress if there is significant whirl or eccentricity between the casings 18 and 20. In that case, the seal lips 42 and 44 would bend up or down only slightly at their juncture with the disks 38 and 40 as the seal walls 24 and 30 orbited off axis, and the stress would not be taken all at a sharply bent back edge, as in a disk seal. Furthermore, the spatial relation of the sealing lips 42, 44 and seals walls 24, 30, the fact that they are radially interleaved with a shallow relative angle and significant axial overlap, enhances sealing effectiveness in another way. A very tortuous nature potential ingress or egress path is created. As shown by the sinuous line in FIG. 11, to get in or out through the annular space between the races 12 and 14, foreign matter would have to traverse an extremely meandering path around and between the interleaved members. In conclusion, the same structural inter-relationships that allow for the simplified assembly process also yield an improved sealing performance.

Variations in the assembly steps illustrated are possible. Rather than squeezing the unit 34 between the two casings 18 and 20 simultaneously, the unit 34 could first be partially installed to one casing or the other. For example, the seal lips 42 could be inserted over seal wall 24, just so far as to not tear seam 36, which would self fixture unit 34 and casing 18 in alignment. Then, the other casing 20 could be pushed in place. Or, conceivably, the assembly and installation process could be combined, by first installing outer casing 18 alone to outer race 12, but only partially, leaving the installation wall 22 protruding partially from the face of outer race 12. Then, the seal lips 42 could be inserted over seal wall 24, as described above, so that the outer race 12 would serve as an alignment fixture for both outer casing 18 and unit 34. Then, inner casing web 32 could be pushed inwardly to its FIG. 11 installed position with a tool that cleared the protruding outer installation wall 22. Doing so would take the components through the same relative motions as shown in FIGS. 8 and 9, shearing the seam 36 and embedding both disks 38 and 40 fully within the casings 20 and 18. Finally, the protruding installation wall 22 could be pushed home to its FIG. 11 position. However as the assembly and installation steps are ordered and carried out, the spatial relationships of the sealing walls 24, 30 and the respective seal lip pairs 42 and 44 yield the self alignment and self installation features described, just from the axial squeezing motion of the casings 18 and 20. Therefore, it will be understood that it is not intended to limit the invention to just the embodiment described.

The embodiments of the invention in which an exclusive property or privilege is claimed are defined as follows:

1. A method of manufacturing and assembling a unitized seal for installation in an annular space between outer and inner, relatively rotatable members, said annular space being bisected widthwise by a central imaginary cylinder and bisected lengthwise by a central imaginary plane perpendicular thereto, said method comprising, providing an outer, generally channel-shaped casing with an annular web extending radially inwardly past said bisecting cylinder and a cylindrical seal wall extending in one axial direction from said annular web to a terminal edge, said terminal edge having a predetermined radial thickness, providing an inner, generally channel-shaped casing with an annular web extending radially outwardly past said bisecting cylinder and a cylindrical seal wall substantially identical in length to said outer casing seal wall but extending in the opposite axial direction from said annular web to a terminal edge having a comparable radial thickness, providing an integrally molded seal unit having, in a pre-assembly state, a pair of inner and outer disks lying on said central plane and sized so as to abut outer and inner casing annular webs respectively, said inner and outer disks also being joined at a frangible seam lying on said central bisecting cylinder, said inner and outer disks each having a pair of axially oppositely extending converging seal lips symmetrically disposed about said outer and inner casing seal walls respectively and defining an annular opening of lesser radial width than said seal walls, concentrically aligning said inner and outer casings with said seal unit axially between, and moving said aligned inner and outer casing axially together, thereby pushing said inner and outer casing cylindrical seal wall terminal edges axially into said respective annular openings and against said inner and outer disks, fracturing said seam, and pushing said inner and outer disks into abutment with said respective annular webs.

2. A method of manufacturing and assembling a unitized seal for installation in an annular space between outer and inner, relatively rotatable members, said annular space being bisected widthwise by a central imaginary cylinder and bisected lengthwise by a central imaginary plane perpendicular thereto, said method comprising, providing an outer, generally channel-shaped casing with an annular web extending radially inwardly past said bisecting cylinder and a cylindrical seal wall extending in one axial direction from said annular web to a terminal edge, said terminal edge having a predetermined radial thickness, providing an inner, generally channel-shaped casing with an annular web extending radially outwardly past said bisecting cylinder and a cylindrical seal wall substantially identical in length to said outer casing seal wall but extending in the opposite axial direction from said annular web to a terminal edge having a comparable radial thickness, providing an integrally molded seal unit having, in a pre-assembly state, a pair of inner and outer disks lying on said central plane and sized so as to abut said outer and inner casing annular webs respectively, said inner and outer disks also being joined at a frangible seam lying on said central bisecting cylinder, said inner and outer disks each having a pair of axially oppositely extending converging seal lips symmetrically disposed about said outer and inner casing seal walls respectively and defining an annular opening of lesser radial width than said inner and outer casing seal walls, concentrically aligning said inner and outer casings with said seal unit axially between, moving said aligned inner and outer casing axially together, thereby pushing said inner and outer casing cylindrical seal wall terminal edges axially into said respective annular openings and against said inner and outer disks, fracturing said seam, and pushing said inner and outer disks into abutment with said respective annular webs, and, axially parting said casings sufficiently to withdraw said inner and outer casing cylindrical seal wall edges axially from said inner and outer disks, thereby leaving said inner and outer casting seal walls engaged only with said converging sealing lips.

\* \* \* \* \*